United States Patent Office
3,110,708
Patented Nov. 12, 1963

3,110,708
PROCESS FOR THE THERMAL OXIDATIVE DEGRADATION AND SIMULTANEOUS PURIFICATION OF LINEAR POLYOLEFINES
Karl Wisseroth, Ludwigshafen (Rhine), Rudolf Herbeck, Carlsberg, Pfalz, Hans Lautenschlager and Hans Moeller, Ludwigshafen (Rhine), Georg Schmidt-Thomée, Heidelberg, and Gerhard Staiger, Hans Georg Trieschmann, and Heinz Weber, Ludwigshafen (Rhine), Germany, assignors to Badische Anilin- & Soda-Fabrik Aktiengesellschaft, Ludwigshafen (Rhine), Germany
No Drawing. Filed July 29, 1960, Ser. No. 46,059
Claims priority, application Germany July 31, 1959
4 Claims. (Cl. 260—93.7)

This invention relates to a process for the thermal oxidative degradation and simultaneous purification of linear polyolefines.

It is known to polymerize olefines such as ethylene or propylene or copolymers of these monomers in the presence of metalliferous catalysts under normal pressure or at increased pressures up to about 150 atmospheres. As metalliferous catalysts there are used especially catalysts which contain heavy metals, for example metal compounds of groups IVB, VB or VIB of the periodic system. Metals from these groups include titanium, vanadium and chromium. These heavy metal compounds are used together with other metal compounds, usually with organometallic compounds, for the low pressure polymerization of olefines. During the polymerization, the catalysts are used up and therefore are contained in the finished polymers in the form of metals or metal compounds.

It is an object of this invention to free linear polyolefines which have been prepared with metalliferous catalysts and which contain these catalysts as impurities, from the said impurities.

By suitable choice of the catalysts and the polymerization conditions it is possible to polymerize very large amounts of olefines with the catalysts used. The larger the amount of the olefine used which is polymerized with a given amount of catalysts, the less is the resultant polyolefine contaminated by these catalysts. By aiming at the highest possible molecular weight of the polyolefines during the polymerization, the catalyst content in these polyolefines is simultaneously diminished. On the other hand, however, polyolefines with high molecular weights are in many cases unsuitable for processing into finished articles. Polypropylene which is obtained by polymerization with a high molecular weight is unsuitable for processing into fibers unless it has been degraded to a polymer of medium molecular weight.

It is therefore another object of the present invention to effect not only a purification of the polyolefines but also a degradation of the same, i.e. to prepare from polyolefines with high molecular weights polyolefines with medium and low molecular weights.

According to this invention the purification of polyolefines which contain metalliferous catalyst residues and their simultaneous degradation from high to lower molecular weights is achieved by dissolving the polyolefines (possibly after a preliminary purification in the usual way, for example by dissolution and reprecipitation) in an inert organic solvent and heating the solution of the polyolefines in the presence of oxygen or agents supplying oxygen.

Further features of the process which are preferably used in this treatment of the polyolefines will be dealt with in the further description.

Polyolefines which are to be treated according to this invention are linear polyolefines such as are obtained by polymerization or copolymerization of olefines containing 2 to 4 carbon atoms with metalliferous catalysts, especially with catalysts containing heavy metals, in a manner usual or known per se by a normal pressure method or low pressure method. Of these linear polyolefines there are mentioned especially linear polyethylene and polypropylene and copolymers of ethylene and propylene, either with each other or with butene-1.

The linear polyolefines are first dissolved in an organic solvent. In some cases it is sufficient for them only to be swollen by the organic solvent, but in most cases it is advantageous to carry out the treatment according to this invention with dilute solutions of the polymers, in the organic solvents. By dilute solutions we understand about 3 to 8% by weight, preferably 4 to 6% by weight solutions of polyolefines in organic solvents.

By organic solvents we understand within the scope of the present invention solvents in which the high molecular weight polyolefines to be treated dissolve at least in low concentrations. The solvent, which may also be a mixture of different organic liquid compounds, should be inert to the polyolefine, i.e., should not react with the polyolefine under the reaction conditions. Suitable solvents include aliphatic, cycloaliphatic or aliphatic-aromatic hydrocarbons which boil between about 70° and 250° C., preferably between 80° and 200° C. Such compounds are decahydronaphthalene or tetrahydronaphthalene or cyclohexane or gasoline mixtures; aromatic hydrocarbons, such as benzene, toluene, xylene or ethylbenzene are also suitable as solvents. These solvents may be used also as mixtures. The choice of the solvent or solvent mixture depends on the temperature at which the treatment is to be carried out and on the molecular weight of the polyolefine to be treated. In cases where the polyolefines dissolve very badly in the said solvents and difficulty is experienced in obtaining 3 to 8% by weight solutions, the treatment according to this invention may also be carried out under increased pressure.

The thermal oxidative degradation and the destruction of the catalyst residues in the polyolefines is carried out at elevated temperatures and in the presence of oxygen. For the purposes of the present invention, elevated temperatures are temperatures between 70° and 250° C., preferably between 80° and 200° C. The oxygen which must be present during the treatment of the polyolefine may be present in various forms. In the simplest case, air is used. The oxygen may however be introduced in pure form or in combined form, for example in the form of peroxide or other compounds which give off oxygen under the reaction conditions.

In many cases it is advantageous to carry out the treatment of the polyolefines in the presence of water. Water need not be present during this treatment, but it does not disturb the degradation and may in many cases facilitate the destruction of the catalyst and the separation of the impurities from the polymer. The amount in which water should be present during the treatment of the polyolefines according to this invention lies between about 0 and 20%. When working in the presence of water, it is often very advantageous to choose such an amount of water that at the end of the treatment two layers are formed and the aqueous lower layer can be readily separated from the supernatant organic layer. The dissolved or possibly precipitated catalyst constituents are then present in the lower layer. The amount of water depends obviously also on the nature of the inert organic solvent used, i.e., in the case of solvents which are only slightly miscible with water, only small amounts of water have to be added, while solvents which dissolve more water, advantageously have larger amounts of water added, i.e., about 10 to 20%.

Since ordinary tap water contains atmospheric oxygen dissolved therein, in some cases it is unnecessary to add any additional oxygen during the treatment according to the invention.

According to a preferred embodiment of the process according to the invention, small amounts of compounds having a basic reaction are added during the thermal treatment of the polyolefine. These basic-reacting compounds are especially suitable for the destruction of the catalyst. They are added in such an amount that the pH in the aqueous phase after the heat treatment is about 7 to 8. As basic-reacting compounds there are preferably used ammonia or alkali hydroxides, such as sodium hydroxide or potassium hydroxide. Calcium hydroxide may also be used, and also inorganic or organic amines, as for example hydroxylamine or aniline.

The duration of the heat treatment may be varied within a wide range. It depends on the properties, such as the molecular weight and the degree of contamination of the polyolefines by the catalyst and the degree of degradation which it is desired to achieve. It also depends on the reaction conditions, i.e., on the nature of the solvent used and on the temperature at which the degradation is carried out. In general, the treatment according to this invention requires about 15 to 200 minutes, preferably 30 to 90 minutes.

A further special embodiment provides for the addition of filtration aids before, during or after the heat treatment to a solution of the polyolefine to be treated. Filtration aids are substances which have a large internal surface onto which the impurities are adsorbed. Examples of such filtration aids are active carbon, aluminum oxide, bleaching earth and kieselguhr.

The treatment of the polyolefines may be carried out in stirring vessels, but especially advantageously in tubes. When working continuously, for example, the solution of the polymer may be led through heated tubes and water, alkali, oxygen or oxygen-supplying compounds being added to the tubes at different points.

After the heat treatment, the polyolefines may be isolated from the solutions in the usual way. If the degradation is carried out in the presence of water, then if possible the aqeuous layer is first separated from the organic layer and the polymer, which is now pure and reduced in molecular weight, recovered by evaporating the solvent or by precipitation. If the degradation is carried out in the presence of filtration aids, the entire solution is first led through separating means, for example a filter press, a suction filter or a frit, and the polyolefine is recovered from the solution which has been freed from the filtration aid and the coarse impurities. In all cases there are obtained according to the process of the invention very pure polyolefines which contain no catalysts or other impurities, or only traces of the same. Moreover the original high molecular weights have been lowered so that the polymers obtained may now be used for many purposes and processed into many products for the production of which they are previously not suitable.

The following examples will further illustrate this invention but the invention is not restricted to these examples. The parts and percentages are by weight.

EXAMPLE 1

In a stirring vessel whose ratio of height to diameter is about 1:5, a low pressure linear polyethylene which has not been purified is diluted with decahydronaphthalene to such an extent that after heating to 145° C. a highly viscous mixture of about 4% of polyethylene is formed. The vessel is filled with the mixture to such an extent that only a very small gas space remains above the mixture but this extends over the whole of the cross-section of the vessel so that the greatest possible phase boundary surface is formed between the solution and the gas space. The gas space is filled with oxygen under normal pressure and can readily be replenished. After stirring for about an hour at 145° C. a mobile solution forms which, after adding about 0.5% of kieselguhr and stirring for about another 15 minutes, is filtered. Upon cooling, a pure white polyethylene with an ash content of 0.01% and a mean molecular weight of 95,000 is precipitated. The original molecular weight of the polymer was 780,000. The molecular weight is determined viscosimetrically by the method according to Duch and Küchler, Z. Elektrochem. 60 (1956), 218.

EXAMPLE 2

Crude low pressure polypropylene which has not been purified is diluted with cyclohexane in the same vessel as in Example 1 to such an extent that after heating to 150° C. a highly viscous mixture of about 5% polypropylene is formed. In the gas space, whose volume is extremely small, oxygen is present under a pressure of about 5 atmospheres. After stirring for about 1 hour and then filtering with an addition of about 0.5% of gamma-aluminum oxide, there is obtained, after separation from the solution, a pure white polypropylene with an ash content below 0.01% and an intrinsic viscosity of 3.1. Pressed plates prepared from the polymer are clearly transparent and exhibit no color whatever. The original intrinsic viscosity of the polymer was 8.7.

EXAMPLE 3

In a continuous-flow vessel there is kept continually in motion at a temperature of 140° C. by a return pipe an about 4% solution of a crude polypropylene in gasoline of the boiling range 80° to 120° C. which fills the vessel practically completely, while an air pressure of 8.5 atmospheres is maintained in the vessel. After circulation for 1¼ hours, the vessel is released from pressure and 0.5% of bleaching earth is added to the solution. After stirring for another quarter of an hour, the mobile solution is filtered. After separation from the solution there is obtained a pure white polypropylene with an ash content of less than 0.01% and an intrinsic viscosity of 3.8. The original intrinsic viscosity of the polymer was 9.8.

EXAMPLE 4

An about 6% mixture of a crude polypropylene with gasoline is charged into a stirring vessel in such a way that the mixture occupies only about two-thirds to three-quarters of the total volume. After heating up to 150° C., the pressure is raised from about 5.5 atmospheres by forcing in 1 further atmosphere of air and 2 further atmospheres of nitrogen. After stirring for 2 hours, 1% of bleaching earth is added and stirring continued for another 15 minutes. After filtration and separation from the solution there is obtained a polypropylene with an ash content of 0.01% and an intrinsic viscosity of 2.8. The initial intrinsic viscosity of the crude polymer was 10.1.

EXAMPLE 5

0.5% of active carbon previously saturated with oxygen at normal pressure is added to an about 5% solution of a crude polypropylene in gasoline at 140° C. while stirring in a stirring vessel. After 45 minutes, the solution is filtered and from the filtrate there is separated a polypropylene with an ash content of less than 0.01% and an intrinsic viscosity of 3.5. The initial intrinsic viscosity of the crude polymer was 9.8.

EXAMPLE 6

10% of cold tap water is added to an about 5% solution of a crude polypropylene in gasoline in a stirring vessel at 155° C. while stirring and powerful stirring continued for three-quarters of an hour. After adding 0.8% of bleaching earth, stirring is continued for another 15 minutes. After filtration, there is separated from the filtrate a polypropylene with an ash content of less than 0.01% and an intrinsic viscosity of 3.8. This product may be molded into colorless plates with a marked degree of transparency. The initial intrinsic viscosity of the crude polymer was 9.2.

EXAMPLE 7

A mixture of 5% of a crude polypropylene with ethylbenzene as solvent is heated to 130° C. in a stirring vessel with slow stirring, a heavily swollen mass thereby being formed. 3 atmospheres of air are forced in and after stirring for another 2 hours at 130° C. a mobile solution is obtained. After adding about 1% of moist kieselguhr (water content about 50%), stirring is continued for another 15 minutes. After filtration there is obtained from the filtrate a polypropylene with an ash content of less than 0.01%. The intrinsic viscosity is 3.2, whereas the original intrinsic viscosity was 8.9.

EXAMPLE 8

An 8% solution of a crude polypropylene in cumene is prepared by continuous stirring at 185° C. Into the pressure-tight vessel there are then forced in about 10% of cold tap water containing dissolved oxygen; the pressure thereby rises to about 14 atmospheres. After half an hour a mobile liquid solution is obtained. After separating the aqueous phase, about 0.5% of bentonite is added and the whole then filtered. From the filtrate there is obtained a polypropylene with an ash content of less than 0.01%. The intrinsic viscosity is 2.9, the initial intrinsic viscosity having been 9.6.

EXAMPLE 9

A crude low pressure linear polyethylene of a mean molecular weight of 510,000 and an ash content of 0.57% is mixed at 140° C. in a pressure vessel with such an amount of cyclohexane that a highly viscous mixture, about 4% with reference to polyethylene, is formed. Air is then forced in up to a total pressure of about 8 atmospheres. After stirring for 1½ hours, a mobile solution is obtained which is filtered with an addition of about 0.05% of bleaching earth. From the filtrate is obtained a very pure polyethylene of a mean molecular weight of 83,000 and an ash content of less than 0.01%.

EXAMPLE 10

A low pressure polyethylene of the mean molecular weight 620,000 and an ash content of 0.83% is mixed with gasoline and heated to 135° C., a highly viscous mixture with a polyethylene content of about 3% being formed. After the treatment with atmospheric oxygen as described in Example 9, a mobile solution is obtained after stirring for 2½ hours. After adding gamma-aluminum oxide, the whole is filtered and from the filtrate a highly pure polyethylene is separated, of which the mean molecular weight is 98,000 with an ash content of less than 0.01%.

EXAMPLE 11

21 parts of low pressure polypropylene with an intrinsic viscosity of 9.2, a fraction insoluble in heptane of 95% and an ash content of 0.35% are dissolved in 500 parts of gasoline at 160° C. in an enamelled pressure vessel. 60 parts of water containing 0.17 part of sodium hydroxide are pumped in while stirring and 0.05 part of oxygen is added to the autoclave previously rinsed with nitrogen. After stirring for an hour at 160° C., the lower aqueous layer is drained off. This treatment of the polymer solution is repeated once with 60 parts of pure water. The polypropylene precipitated from the solution after cooling has after drying an intrinsic viscosity of 4.2 with a fraction insoluble in heptane of 94.3%. The ash content is 0.023%. If the sodium hydroxide be omitted from the first water treatment, the polypropylene contains 0.045% of ash. By working under the same conditions but without adding water, the intrinsic viscosity decreases only to 8.8.

If under the same conditions 0.14 part of oxygen is added instead of 0.05 part, the intrinsic viscosity is lowered to 2.6 after heat treatment for 90 minutes.

EXAMPLE 12

1.5 parts of a low pressure polyethylene with an intrinsic viscosity of 3.8 are dissolved in 26 parts of xylene at 185° C. with the addition of 3 parts of water. Into the free space of the autoclave there are metered 0.004 part of oxygen and 0.006 part of ammonia. After stirring at 185° C. for half an hour and after separating the water, a polyethylene with an intrinsic viscosity of 2.3 may be precipitated from the xylene solution. The ash content in this polyethylene is less than 0.01.

EXAMPLE 13

Into a stainless steel autoclave there are charged 0.9 part of polypropylene with an intrinsic viscosity of 7.3 and an ash content of 0.28%, 21 parts of gasoline and 1 part of water in which 0.003 part of ammonia is dissolved. The whole is heated at 160° C. while stirring and there is pumped in a solution of 0.002 part of hydrogen peroxide in 2 parts of water which has been saturated with molecular oxygen at room temperature and normal pressure. After stirring for 20 minutes at 160° C., the aqueous layer is drained off and the gasoline solution washed by pumping in another 2 parts of water at 160° C. From the gasoline solution there is obtained a polypropylene with an intrinsic viscosity of 3.9 and an ash content of 0.012%.

EXAMPLE 14

35 parts of a 4% solution of polypropylene in gasoline flow per hour through a tube system heated to 170° C. The polypropylene has an intrinsic viscosity of 8.9.

Into this main stream is pumped, for the purpose of degradation, a solution of 0.002 part of 2,2-bis-(tertiary-butylperoxy)-butane in 1.8 parts of gasoline per hour. The tube system is of such dimensions that the main stream passes therethrough in 20 minutes. At a distance from the beginning of the system, corresponding to this 20 minutes residence period, there is pressed in per hour a solution, heated to 170° C., of 0.005 part of ammonia in 2.5 parts of water. The mixture of gasoline, polypropylene and water passes through a separating vessel for the separation of the water. The gasoline solution contains a polypropylene with an intrinsic viscosity of 3.7 and an ash content of 0.015%.

EXAMPLE 15

0.9 part of polypropylene with an intrinsic viscosity of 7.3 and an ash content of 0.28%, 21 parts of gasoline and 3 parts of water in which 0.003 part of ammonia is dissolved are heated to 160° C. while stirring in an autoclave for 20 minutes. 0.005 part of oxygen is previously charged into the free autoclave space. After draining off the aqueous layer and washing with 2 parts of water, there may be recovered from the gasoline solution a polypropylene with an intrinsic viscosity of 4.2 which contains 0.015% of ash.

By working in the same way but without the addition of ammonia, the intrinsic viscosity is lowered only to 4.5 and the ash content only to 0.050%.

EXAMPLE 16

1.5 parts of a copolymer of 95% of ethylene and 5% of butene-(1) having an intrinsic viscosity of 2.3 are charged into a pressure vessel with the addition of 5 parts of water in 30 parts of decahydronaphthalene. 0.003 part of oxygen and 0.004 part of ammonia are metered into the gas space. After stirring for an hour at 240° C. and separating the water, a polymer of the intrinsic viscosity 1.8 may be precipitated from the solution. The ash content has been lowered from 0.26 to 0.02%.

polypropylene is obtained whose intrinsic viscosity is considerably reduced and whose ash content is as low as 0.05% or less.

Table

| | | a | b | c | d | e | f | g | h |
|---|---|---|---|---|---|---|---|---|---|
| A | Starting material: | | | | | | | | |
| | Parts of polypropylene | 21 | 30 | 30 | 30 | 30 | 30 | 30 | 30 |
| | Intrinsic viscosity | 9.2 | 6.5 | 6.5 | 6.5 | 6.2 | 6.4 | 6.4 | 6.4 |
| | Insoluble in heptane (percent) | 95.1 | 94.2 | 94.2 | 94.2 | 95.3 | 93.8 | 93.8 | 93.8 |
| | Ash content (percent by weight) | 0.35 | 0.42 | 0.42 | 0.42 | 0.32 | 0.34 | 0.34 | 0.34 |
| | Titanium content (percent by weight) | 0.04 | 0.05 | 0.05 | 0.05 | 0.03 | 0.03 | 0.03 | 0.03 |
| B | Processing technique: Preliminary purification: | | | | | | | | |
| | Parts of gasoline | 350 | 350 | 350 | 350 | 350 | 350 | 350 | 350 |
| | Parts of oxygen | 0.02 | 0.02 | 0.02 | 0.20 | 0.02 | 0.02 | 0.02 | 0.02 |
| | Parts of water | 15 | 15 | 15 | 15 | 15 | 15 | 100 | 100 |
| | Type of alkali | $NH_3$ | $NH_3$ | $NH_3$ | $NH_3$ | $NH_3$ | $NH_3$ | $NaHCO_3$ | $NaHCO_3 BaO_2$ |
| | Parts of alkali | 0.1 | 0.1 | 0.1 | 0.1 | 0.1 | 0.1 | 0.25 | 0.1  0.18 |
| | Reaction period (min.) | 60 | 60 | 60 | 200 | 60 | 60 | 60 | 60 |
| | Temperature (° C.) | 175 | 175 | 175 | 175 | 175 | 175 | 175 | 175 |
| | pH of water after discharge | 7.8 | 7.4 | 7.6 | 7.7 | 7.5 | 7.8 | 8.0 | 8.1 |
| | After washing: | | | | | | | | |
| | Parts of water | 60 | 60 | 60 | 60 | 60 | 60 | 30 | 30 |
| | Reaction period (min.) | 15 | 15 | 15 | 15 | 15 | 15 | 15 | 15 |
| | Temperature (° C.) | 140 | 140 | 140 | 140 | 140 | 140 | 175 | 175 |
| | Filtration: | | | | | | | | |
| | Filter material | Cellulose | | | | | | | |
| | Filter surface (m.²) | 0.9 | 0.9 | 0.9 | 0.9 | 0.9 | 0.9 | 0.9 | 0.9 |
| | Pore size μ | 10 | 10 | 10 | 10 | 10 | 10 | 10 | 10 |
| | Filter aid | Kieselguhr | | | | | Bleaching earth | | |
| | Parts of filter aid | 0.5 | 0.5 | 0.5 | 0.5 | 0.5 | 0.5+1.5 | 0.5 | 0.5 |
| C | Purified product: | | | | | | | | |
| | Intrinsic viscosity | 3.6 | 3.1 | 3.1 | 1.9 | 3.0 | 3.0 | 3.1 | 3.05 |
| | Insoluble in heptane (percent) | 94.8 | 94.1 | 94.5 | 92.7 | 94.1 | 93.7 | 93.8 | 93.7 |
| | Ash content (percent by weight) | 0.002 | 0.004 | 0.005 | 0.0015 | 0.003 | 0.005 | 0.002 | 0.002 |
| | Titanium content (percent by weight) | 0.0005 | 0.0008 | 0.0008 | 0.0005 | 0.0007 | 0.0005 | 0.0006 | 0.0005 |

EXAMPLES 17a–17h

The following table is a compilation of 8 examples, showing the quantity and type of the polypropylene used as the starting material (section A); the processing technique according to our invention (section B) and the data concerning intrinsic viscosity and ash content of the purified and degraded polypropylene (section C). In all of the said examples the following processing technique is applied:

Low pressure polypropylene with the intrinsic viscosity and ash content given in the respective column of the table is dissolved in gasoline with a boiling range of from 80° to 110° C. To this solution, water, oxygen and alkali, for example ammonia or sodium bicarbonate, are added in the amounts given in the table. After allowing the reaction to proceed for the period and at the temperature given in the table, the water is drawn off. The polymer solution is again washed with water and then passed through a filter consisting of ceramic or cellulose material. Filter aids, such as kieselguhr or bleaching earth or both, are also used.

It appears from the table that in all the above cases

We claim:

1. A process for the thermal oxidative degradation and simultaneous purification of linear polyolefines obtained by polymerization of olefines containing from 2 to 4 carbon atoms with metalliferous catalysts which comprises treating a 3 to 8 percent solution of the polyolefine for 15 to 200 minutes in an organic solvent which is inert under the reaction conditions in the presence of oxygen at a temperature of between 70° and 200° C.

2. A process as claimed in claim 1, wherein the polyolefine is a linear polyethylene.

3. A process as claimed in claim 1, wherein the linear polyolefine is linear polypropylene.

4. A process as claimed in claim 1 in which up to 20% by weight of water with reference to the weight of the solution of the olefine is added.

References Cited in the file of this patent

UNITED STATES PATENTS

| | | |
|---|---|---|
| 2,918,461 | Flynn | Dec. 22, 1959 |
| 3,001,977 | Wisseroth et al. | Sept. 26, 1961 |
| 3,004,963 | Bartolomeo | Oct. 17, 1961 |
| 3,006,907 | Rehn et al. | Oct. 31, 1961 |
| 3,012,022 | Reed et al. | Dec. 5, 1961 |

FOREIGN PATENTS

| | | |
|---|---|---|
| 476,476 | Canada | Aug. 28, 1951 |